(12) United States Patent
Kaler et al.

(10) Patent No.: US 7,152,224 B1
(45) Date of Patent: *Dec. 19, 2006

(54) VERSIONED PROJECT ASSOCIATIONS

(75) Inventors: Christopher G. Kaler, Redmond, WA (US); Steven J. Kruy, Carnation, WA (US); Kenneth D. Hardy, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 293 days.

This patent is subject to a terminal disclaimer.

(21) Appl. No.: 09/717,587

(22) Filed: Nov. 21, 2000

(51) Int. Cl.
*G06F 9/44* (2006.01)

(52) U.S. Cl. ...................................................... 717/121

(58) Field of Classification Search ........ 707/101–103, 707/120–123, 203–204, 3, 10, 100; 709/201, 709/202, 217; 715/511; 717/101–103, 120–123, 717/108
See application file for complete search history.

(56) References Cited

U.S. PATENT DOCUMENTS 5,649,200 A * 7/1997 Leblang et al. ............. 717/122
5,862,325 A * 1/1999 Reed et al. ................. 709/201
5,890,166 A * 3/1999 Eisenberg et al. .......... 707/203
6,366,933 B1 * 4/2002 Ball et al. ................... 715/511
6,460,052 B1 * 10/2002 Thomas et al. ............. 707/203

OTHER PUBLICATIONS

Rusted, H. While the CAT's away (CAT time management software for the MAC), *MicroDecision*, Dec. 1988, 90, 76-80.

* cited by examiner

*Primary Examiner*—Kakali Chaki
*Assistant Examiner*—Tuan Anh Vu
(74) *Attorney, Agent, or Firm*—Woodcock Washburn LLP (57) ABSTRACT

Systems, clients, servers, methods, and computer-readable media of varying scope are described that maintain versions of associations between project management objects such as source cod files, bug data, development issue data, and software specifications. One aspect of the system is that the project association data is stored in a relational database. A link set data structure provides a link to objects that are to be associated together. A link content data structure describes an individual project management object that is linked with other objects in the link set. As a software development project progresses through its life cycle, changes to the associations occur. The changes are captured and stored in the database. Previous versions of the associations are maintained in the project database, thereby allowing a user to query for the state of the project associations as they existed at any particular point in time.

10 Claims, 7 Drawing Sheets

VERSIONED PROJECT ASSOCIATIONS

FIELD

The present invention pertains generally to computer software development, and more particularly to maintaining versions of associations between software development objects.

RELATED FILES

This application is related to the following applications, both of which are filed on the same day and assigned to the same assignee as the present application:

"Versioned Project Data"—Ser. No. 09/717,645, now issued as U.S. Pat. No. 6,978,281, and "Project Branching" Ser. No. 09/717,723, now issued as U.S. Pat. No. 6,766,334.

These related applications are hereby incorporated by reference herein.

COPYRIGHT NOTICE AND PERMISSION

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright® 2000, Microsoft, Inc.

BACKGROUND

A typical software development project will involve many different source code modules and files that are being worked on by teams of software developers and other team members such as documentation writers. In addition, the typical software development project will have a reasonably long life cycle of development, testing, release, and maintenance. In order track changes over time, version control systems have been developed to aid teams of software developers and others to maintain the often complex code associated with a particular development project. Version control systems of the prior art typically provide versioning only for source code files and modules comprising the development project.

While the source code files that comprise a software product are a requirement, they are not the only objects involved in the software development process. For example, design documents and bug or issue reports are also part of many software development projects. These objects may be stored in different systems, in different formats, and in different physical regions of a computer system.

The above-described objects often have logical associations between them. For example, a bug report will typically be associated with one or more of the modules and source files that make up a software product. Furthermore, certain features of the software may be described in specification documents. It is desirable to associate these documents with the source code files that implement the feature.

Previous systems have provided limited ability to associate issues with source code changes. Examples of such systems include ClearCase from Rational Software Corp. and PVCS from Merant Intl. Ltd. However, a disadvantage of these and other systems is that while they can associate issues with source code, they do not provide a generalized mechanism to associate a variety of development objects with one another. Furthermore, they do not provide the ability to maintain multiple versions of such associations. Thus, these systems lack the ability to perform temporal queries to recreate the state of project associations at arbitrary points in time.

Therefore, there is a need in the art for a system that maintains versions of project associations in a manner that saves all of the previous state of the associations, and that can be queried to produce set of associations for a project as they were at a particular point in time.

SUMMARY

The above-mentioned shortcomings, disadvantages and problems are addressed by the present invention, which will be understood by reading and studying the following specification.

The systems and methods presented maintain versions of associations between project management objects such as source code files, bug data, development issue data, and software specifications. One aspect of the invention is that the project association data is stored in a relational database. A link set data structure provides a link to objects that are to be associated together. A link content data structure describes an individual project management object that is to linked with other objects in the link set. As a software development project progresses through its life cycle, changes to the associations occur. The changes are captured and stored in the database. Previous versions of the associations are maintained in the project database, thereby allowing a user to query for the state of the project associations as they existed at any particular point in time.

The present invention describes systems, methods, and computer-readable media of varying scope. In addition to the aspects and advantages of the present invention described in this summary, further aspects and advantages of the invention will become apparent by reference to the drawings and by reading the detailed description that follows.

DETAILED DESCRIPTION

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into multiple sections. In the first section, the hardware and the operating environment in conjunction with which embodiments of the invention may be practiced are described. In the second section, a system level overview of the invention is presented. In the third section, methods of an exemplary embodiment of the invention are provided. Finally, in the fourth section, a conclusion of the detailed description is provided.

Hardware and Operating Environment

Figure 1:
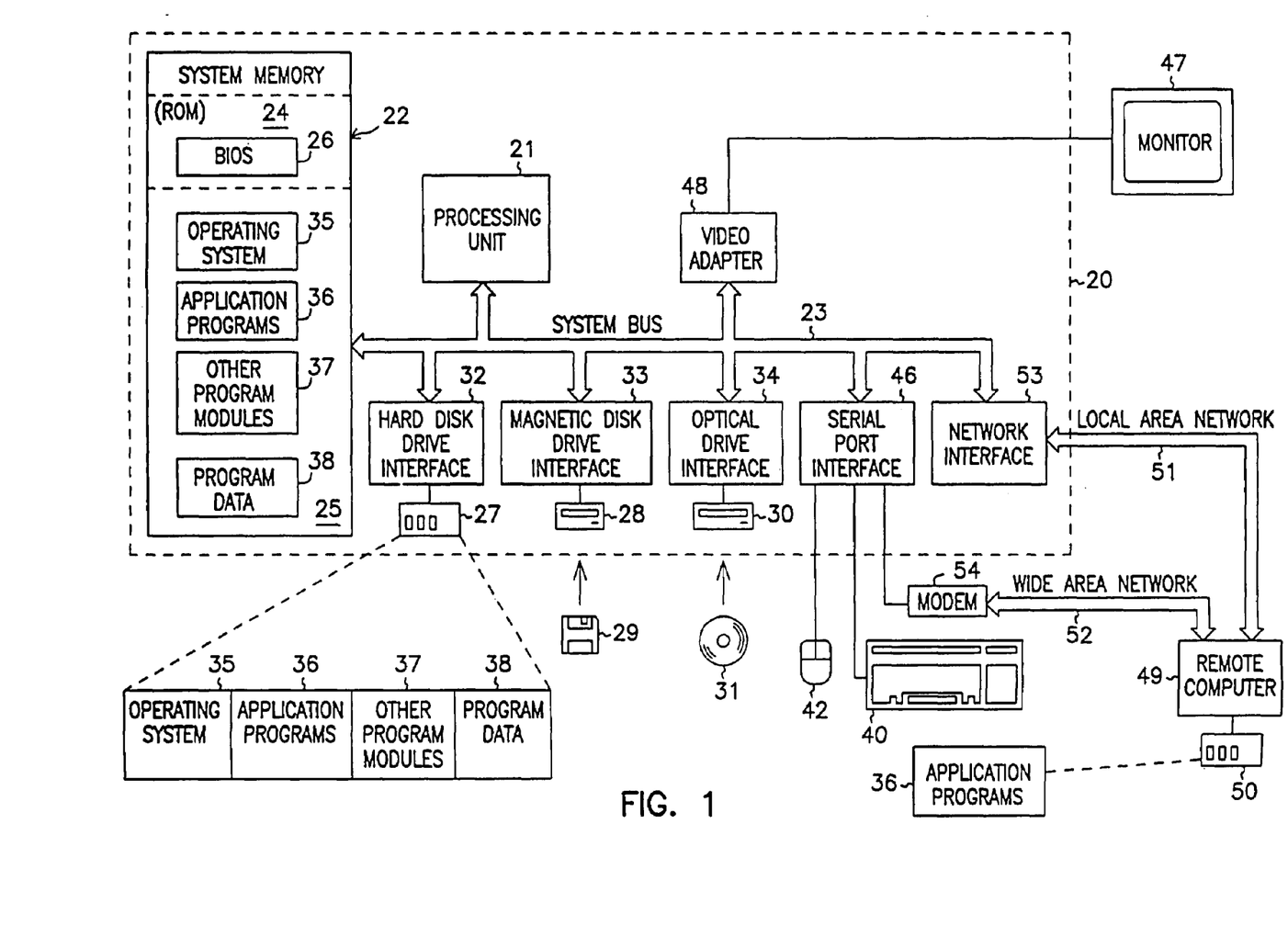
FIG. 1 shows a diagram of the hardware and operating environment in conjunction with which embodiments of the invention may be practiced.

FIG. 1 is a diagram of the hardware and operating environment in conjunction with which embodiments of the invention may be practiced. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, objects, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 20, including a processing unit 21, a system memory 22, and a system bus 23 that operatively couples various system components including the system memory to the processing unit 21. There may be only one or there may be more than one processing unit 21, such that the processor of computer 20 comprises a single central-processing unit (CPU), or a plurality of processing units, commonly referred to as a parallel processing environment. The computer 20 may be a conventional computer, a distributed computer, or any other type of computer; the invention is not so limited.

The system bus 23 may be any of several types of bus structures including a memory bus or memory controller, a peripheral bus, and a local bus using any of a variety of bus architectures. The system memory may also be referred to as simply the memory, and includes read only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated computer-readable media provide nonvolatile storage of computer-readable instructions, data structures, program modules and other data for the computer 20. It should be appreciated by those skilled in the art that any type of computer-readable media which can store data that is accessible by a computer, such as magnetic cassettes, flash memory cards, digital video disks, Bernoulli cartridges, random access memories (RAMs), read only memories (ROMs), and the like, may be used in the exemplary operating environment.

A number of program modules may be stored on the hard disk, magnetic disk 29, optical disk 31, ROM 24, or RAM 25, including an operating system 35, one or more application programs 36, other program modules 37, and program data 38. A user may enter commands and information into the personal computer 20 through input devices such as a keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the invention is not limited to a particular type of communications device. The remote computer 49 may be another computer, a server, a router, a network PC, a client, a peer device or other common network node, and typically includes many or all of the elements described above relative to the computer 20, although only a memory storage device 50 has been illustrated in FIG. 1. The logical connections depicted in FIG. 1 include a local-area network (LAN) 51 and a wide-area network (WAN) 52. Such networking environments are commonplace in offices, enterprise-wide computer networks, intranets and the Internet.

When used in a LAN-networking environment, the computer 20 is connected to the local network 51 through a network interface or adapter 53, which is one type of communications device. When used in a WAN-networking environment, the computer 20 typically includes a modem 54, a type of communications device, or any other type of communications device for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System Level Overview

Figure 2:
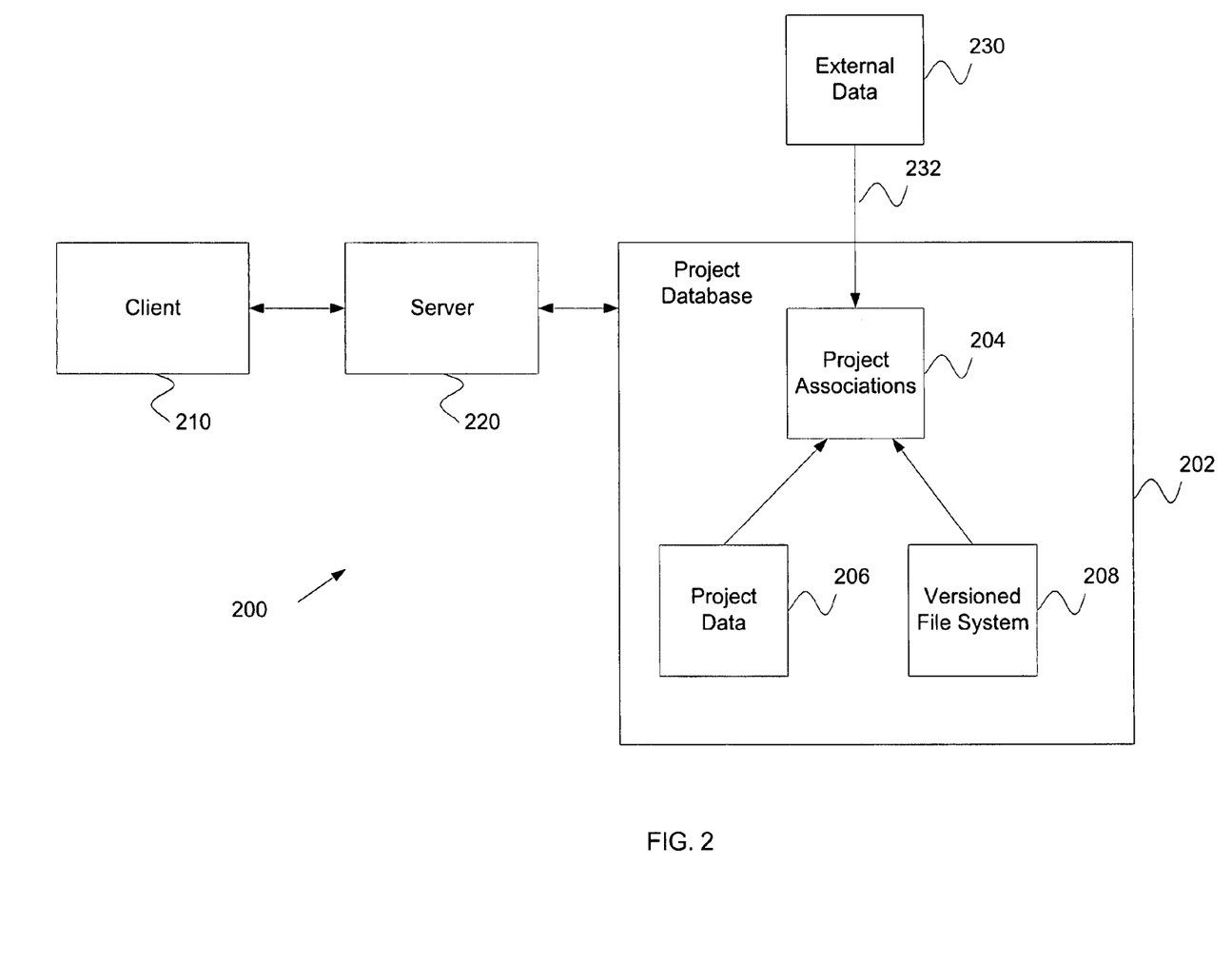
FIG. 2 is a block diagram illustrating a system level overview of a system performing versioning of project associations incorporating the present invention.

FIG. 2 illustrates a project management system 200 according to an embodiment of the invention. Project management system 200 includes project management server 220, project management client 210, and project database 202.

Project management server 220 provides project management services to a team of software developers running client applications 210. Among the services provided by the project management server are project issue or bug tracking, and source code control. In one embodiment of the invention, project management server 220 is configurable to provide services for a team of software developers, all working on one or more related projects.

Client application 210 provides a user interface for developers to use and manipulate data maintained by project management server 220. Client application 210 communicates with project management server 220 and provides the ability for a user to browse issue or bug tracking data, and to check out and check in versions of the source code for a project. In addition, client application 210 provides an interface for creating and maintaining associations between the various entities and objects in project database 202.

Project database 202 comprises one or more databases capable of providing persistent storage for various project related data and files. While any database capable of storing and retrieving data can be used, it is desirable that project database 202 be a relational database. Use of a relational database allows complicated SQL queries to be performed that can access and mine the database. In one embodiment of the invention, project database 202 is the SQL Server® database from Microsoft® Corp. In alternative embodiments, the database can be Oracle®, Informix®, or Sybase®. The invention is not limited to any particular database system.

In one embodiment of the invention, project database 202 includes project data 206, versioned file system 208, and project associations 204. Versioned file system 208 is a subsystem that provides for the storage and retrieval of potentially multiple versions of file oriented data. In one embodiment of the invention, the file oriented data can include source code files associated with a project, dynamic link libraries, component executables such as COM (Component Object Model) objects, and specification documents.

Project data 206, in one embodiment of the invention, includes data related to software defects (i.e. "bugs"), tasks, development milestones, and other issues that are related to a project. Like the files maintained by versioned file system 208, the project data 206 can be versioned. Further details on the versioning of project data are provided in the U.S. patent application entitled "Versioned Project Data", Ser. No. 09/717,645, now issued as U.S. Pat. No. 6,978,281, which is hereby incorporated herein by reference.

Project association data 204 maintains versions of associations between project data 206 and versioned file system 208. The associations can be associations between individual project data elements, associations between individual project files, and associations of individual elements with individual files. A set of entities that are related via such associations is called a link set. For example, assume that a client application 210 has checked out a set of files in response to a reported bug. Further assume that the developer has fixed the bug, and that the fix required modification to five files. The developer checks in the five files to project management server 220, which stores the new versions in versioned file system 208. The set of five files is a specialized version of a link set referred to as a change set. The set of files contained in the link set will be associated in project association data 204.

A further example of link set relates a bug or issue to the file or files that have been, or must be modified to fix the bug or address the issue. In the example presented above, the bug data maintained in versioned project data 206 can be associated in a link set to the set of files modified to fix the bug. Again, this association is maintained in project association data 204.

A still further example of a link set relates one bug or issue to another bug or issue. For instance, assume that a first bug is dependent on a second bug, that is, the second bug must be fixed before the first bug can be addressed. A link set relating the two bugs can be established and maintained in project association data 204.

Finally, a link set can relate project documents to source files or project data. For example, a source document describing a particular feature of the software can be associated with the set of source code files that implement the feature.

It is important to note that each of the elements above is separately versionable, including the association itself. For example, a link set relating a bug report to the set of files that are involved in fixing the bug will comprise a particular version of a link set that relates a particular version of the bug report to the particular versions of the files that were modified to fix the bug. Later, if a new bug is related to the original bug, a new version of the link set can be created that relates a particular version of the new bug report to the particular versions of the previous bug report and the particular versions of the modified files.

While particular versions of entities are often specified in link sets, the invention is not limited to the specification of particular versions. For instance, in some cases, a user is merely interested in the latest version of an object. As an example, a particular version of a design specification associated with a project is not necessarily related to a particular version of the source code files implementing the project. Thus, the system allows a "default" version to be specified. In this example, the latest version of the specification is associated with the source code. Thus, whenever a version of a source code file is checked out, the latest version of the specification associated with the file can be obtained, regardless of the version of the source code file.

In alternative embodiments of the invention, the link sets maintained in project association data 204 can refer to external data 230. In these alternative embodiments, external data 230 can be a non-versioned entity such as a web site. In this case, the association is versioned, but the external data is not. If the link 232 to the external data 230 changes, a new version of the association can be created to reflect the change.

It should be noted that although the exemplary embodiment of the invention is shown as a three-tier architecture in FIG. 2, the invention is not limited to any particular number of tiers, processes, processors, or other configuration. For example, the components shown in FIG. 2 could all execute on a single computer system with a single processor, or multiple processors. Furthermore, the components shown in FIG. 2 could be distributed across multiple computer systems. For example, the project data 206, the versioned file system 208, and the project association data 204 could all reside on separate machines, or be executed as separate processes or threads in a system comprising one or more computers.

Figure 3:
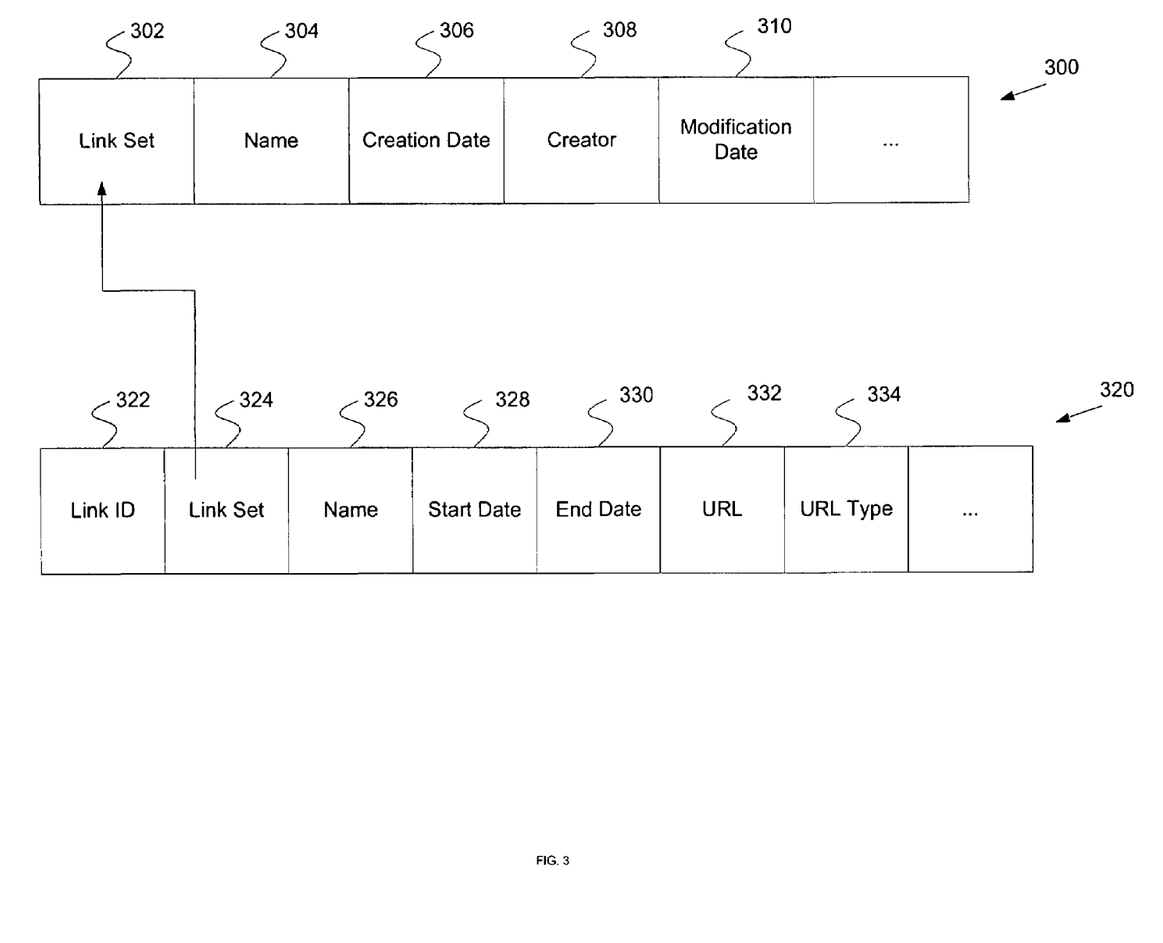
FIG. 3 is a diagram of a data structure according to an embodiment of the invention.

An overview of data structures used in the above-described system 200 is described in FIG. 3. In one embodiment of the invention, two data structures, a link set data structure 300 and a link content data structure 320, are maintained as tables in project associations data 204.

Link set data structure 300 comprises data that describes the link set as a whole. That is, data that applies to each content element in the link set. In one embodiment, link set data structure 300 includes a link set identifier 302, link set name 304, creation date 306, creator 308, modification date 310, and link properties 312. Link set identifier 302 is an identifier that operates as a database key to uniquely identify a particular link set. Link set name 304 is a user-annotated text string that provides a reference name to label the link set in a meaningful way. Creation date 306 stores the date the link set was created. Creator 308 stores an identifier that identifies the person or entity creating the link set. The identifier can be a text string containing the user name, or it can be a numeric identifier associated with the user. Modification date 310 stores the date the link set was last modified. Link properties describe other attributes about the link set. Examples of these other attributes include the following:

whether the link set is a change set whether the link set is part of a set of dependent bugs notes indicating where the changes came from, and where they were applied creator comments security settings The above list is not intended to be exhaustive, and those of skill in the art will appreciate that other properties can be used to describe line sets.

Link content data structure 320 contains data that describes an individual content element of a link set. In one embodiment of the invention, link content data structure 320 includes a link id 322, a link set reference 324, a link content name 326, start date 328, end date 330, URL (Uniform Resource Locator) 332, URL type 334, and link content properties 336. The URL 332 and URL type 334 describe link references in one embodiment. In other embodiments, the link content data structure can contain other data necessary to refer, with appropriate precision, to an individual content element.

Link id 322 is an identifier that operates as a database key to uniquely identify a particular link content item. Link set reference 324 contains an identifier of a link set data structure that contains the content item. In other words, link set reference 324 is a foreign key to the link set data structure. Thus, as will be apparent to those of skill in the art, multiple link content items can be associated with a link set. Each of the link content items will have a unique value for link id 322, and each of the link set reference fields will contain a value that is the link set identifier for the link set containing all of the link content items.

Link content name 326 is a text string containing a user-annotated name for the link content item.

Start date 328 and end date 330 define a time span when this particular version of the link content item was associated with other link content items. Start date 328 contains a value defining when the association came into existence, and end date 330 contains a value when the association was removed. If the version is currently the most recent, end date 330 will be blank, or null.

In one embodiment, URL 332 stores a reference to the object being referred to by this link content item. As noted above, the object referred to can be a source code file, a project data object such as a bug, issue, development milestone etc., a specification file, or a reference to external data. Further detail on the format of URL 332 will be provided below in reference to FIG. 4.

URL type 334 stores a value indicating the type of URL 332. In one embodiment of the invention, URL 334 indicates whether URL 332 is an absolute URL or a relative URL. An absolute URL is one in which each of the constituent components of the URL resolve to a particular and invariant location. A relative URL is one in which at least one of the constituent components is relative to a location that is determined outside of the URL itself, and can vary. For example, a URL typically has a machine or server component, a team component, an object component, a configuration component, and a version component. An absolute URL will specify precisely the machine, team, object, configuration and version. In contrast, a relative URL will omit one or more of the components, leaving the omitted component to be determined by the context or environment that the user is working in. For example, the user will typically be a member of a particular team. The team component of the URL may be omitted from URL 332. In this case, URL type 334 will indicate that the URL is team relative. Whenever URL 332 is resolved, the team component will be implied to be the team that the user causing the URL to be resolved is a member of. Providing relative URLs is desirable, because it provides flexibility in locating the data stores in project database 202, and it make URL specification easier for the user. Relative URLs are more flexible, because the underlying data can be rehosted on different machines or servers without the need to respecify each link content URL 332.

URL properties 336, in one embodiment of the invention, provide further information about the link content item. For example, if the link content item is a dependent bug, URL properties 336 will indicate the bug that the link content item is dependent on. In an alternative embodiment of the invention, properties 336 define the behavior of the system when a version of an association is copied to a new configuration. Generally, the property will either be set so as to preserve the association when the link set is copied to a new configuration, or to break the association (i.e. remove the link content item from the link set) when the link set is copied to a new configuration. In still further embodiments, properties 336 include a delta flag that indicates whether the linked item is a full version or just parts of a file that changed. In yet other embodiments, properties 336 include a primary link flag that can be used to define a more important item in a link set. For example, the primary link flag can be used to indicate the first bug in a dependency chain, or the instance of a duplicate bug that should actually be fixed.

Figure 4:
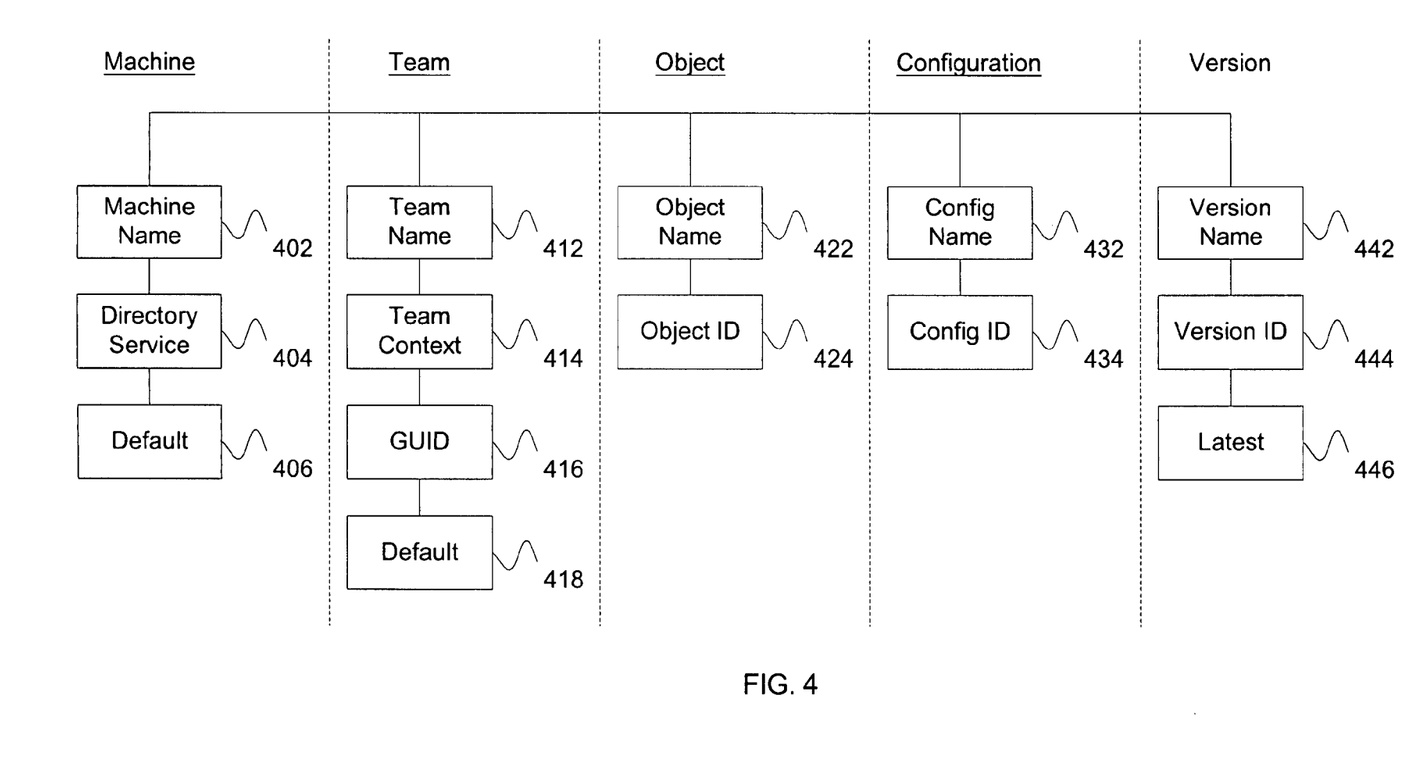
FIG. 4 is a diagram of components of a Uniform Resource Locator used in various embodiments of the invention.

FIG. 4 provides further detail regarding the components of a URL 332 according to an embodiment of the invention.

In this exemplary embodiment, the URL 332 can include a machine component, a team component, an object component, a configuration component, and a version component. In FIG. 4, the individual components are separated by vertical dashed lines. Within each column defined by the vertical dashed lines, alternative expressions and defaults for each component are provided. The invention is not limited to the components specified and described below, nor is the invention limited to any particular combination of components for specifying URLs.

The machine component, also referred to as a server component, can be an actual machine (or server) name 402, it can be returned by a directory service lookup 404, or it can be a default machine name 406. A machine (or server) name 402 identifies a particular computer system or server by its network name or alias. A directory service lookup 404 provides a function (i.e. project management) to a directory service, and the directory service returns the name of a server or system that provides the services. In one embodiment of the invention, the Active Directory service provides the directory lookup services. Finally, the machine name can be a default machine name 406. The default can be determined in a number of ways, including environment variables, configuration files, and system registry variables. The invention is not limited to any particular mechanism for providing a default machine or server name.

The team component of the URL specifies a development team. In some embodiments of the invention, an individual machine or server can host data for a number of different development teams. The team component identifies which of the potentially multiple development team databases contains the desired object. The team component can be a team name 412, a team context 414, or a Globally Unique Identifier (GUID) identifying the team. A team name 412 is an explicit specification of a particular team. A team context 414 determines the team name from the context in which the URL is resolved. For example, a context can be established by logging into a particular team server. A GUID 416 is a unique identifier assigned to represent the team. Finally, a default team name 418 can be used to resolve the team name in a manner similar to the default machine or server name.

The object component specifies a particular project data object such as a source file, a bug, a specification file, or other project data. In one embodiment of the invention, the object component can be specified by object name 422 or an object ID 424. Object name 422 can be a file name, in the case of source code files or specification files, or the name can be the name or label assigned to a particular bug. Object ID 424 can be a system assigned identifier, such as a GUID or database key, that uniquely specifies the object.

The configuration component of URL 332 identifies a particular configuration that the project object is a member of. A configuration is a combination of project object versions that, when assembled, forms a variant of a project. Each configuration can be independently manipulated, and each exists in a workspace that is logically separate from other configurations. For example, one configuration may exist in a developer's personal computer. One example of a configuration is a "branch" of a development project. A project branch typically occurs when one or more source code files undergo two parallel streams of modifications. For example, on branch may be a continuation of the development process by a first developer, while a second branch is created to allow a bug to be fixed by a second developer. In order to allow the two developers to work on the same file or files simultaneously, a copy of the source exists in each branch. Each developer works on his or her own copy without the need to worry about changes the other developer may be making. The independent changes can be merged back into a single branch at a later time if desired. A second example is a "release" of a project. A release typically comprises a set of particular versions of source code files. A first release will contain a set of files at particular versions, while a second and subsequent release can contain the same set of files, however some of the files will be at different version levels. Further details on the operation of branching are presented in the cofiled, copending United States patent application entitled "Project Branching", Ser. No. 09/717,723, which is hereby incorporated by reference herein.

The configuration component thus identifies which of the possible multiple configurations contains the desired object. In one embodiment of the invention, the configuration component identifies the configuration by configuration name 432, or by a configuration ID 434. A configuration name is a label assigned to the configuration. For example, the label "Beta 1" can be used to identify a configuration that is the first beta release of a software development product. Alternatively, the configuration can be identified by a system assigned configuration identifier 434. In this case, the configuration identifier acts as a database key to identify a particular configuration.

The version component identifies the version of the object that is desired. In one embodiment of the invention, the version component can be identified by a version name 442, a version identifier 444, or the version can default to be the latest version 446. A version name 442 is a label assigned to the version, such as a number indicating where in the sequence of versions the current version exists. The version name can take a variety of other forms. For example, a version name in some embodiments comprises a combination of a configuration name and a sequence number. In other embodiments, the version name can be a relative number with respect to a particular version. For example, a version name of "−2" can refer to the version that is two versions prior to the latest version. As those of skill in the art will appreciate, a version name can comprise any of a number of mechanisms that can identify a version. A version ID 444 is a system assigned identifier that uniquely identifies the desired version. The identifier thus operates as a database key. Alternatively, the version component can be omitted, in which case the latest version 446 can be used. In this case, the latest version can comprise the version most recent in time, or it can comprise the version with the "highest" version label.

As those of skill in the art will appreciate, the URL can specify an object in a configuration independent and/or version independent manner. By omitting one or both of the components, the URL becomes independent with respect to that component. For example, in the case of a specification, the version component of the URL will typically be omitted. This is because a specification is typically not tightly coupled to the source code files. In this case, the latest version of the specification is all that is required, previous versions are not necessarily relevant.

This section has provided an overview of the components and data structures used in various embodiments of the invention that implement versioned project associations. The next section will describe methods according to embodiments of the invention that operate on versioned project associations.

METHODS OF THE INVENTION

In the previous section, a system level overview of the operation of an exemplary embodiment of the invention was described. In this section, the particular methods of the invention performed by an operating environment executing an exemplary embodiment of the invention are described by reference to a series of flowcharts shown in FIGS. 5A, 5B and 5C. The methods to be performed by the operating environment constitute computer programs made up of computer-executable instructions. Describing the methods by reference to a flowchart enables one skilled in the art to develop such programs including such instructions to carry out the methods on suitable computers (the processor of the computer executing the instructions from computer-readable media). The methods illustrated in FIGS. 5A–5C are inclusive of the acts required to be taken by an operating environment executing an exemplary embodiment of the invention.

Figure 5A:
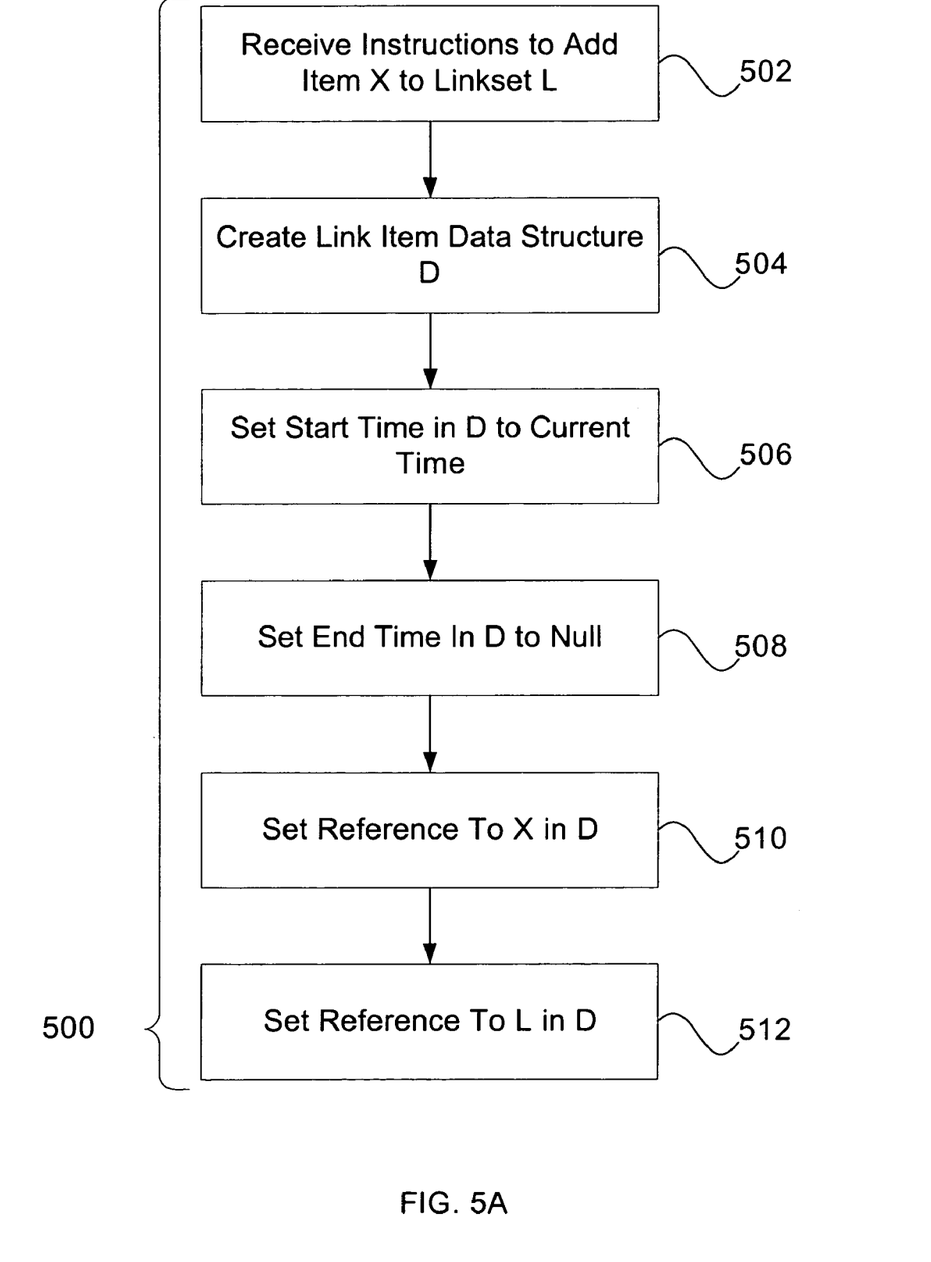
FIGS. 5A, 5B and 5C are flowcharts illustrating methods of versioning associations between project items according to an embodiment of the invention.
Figure 5B:
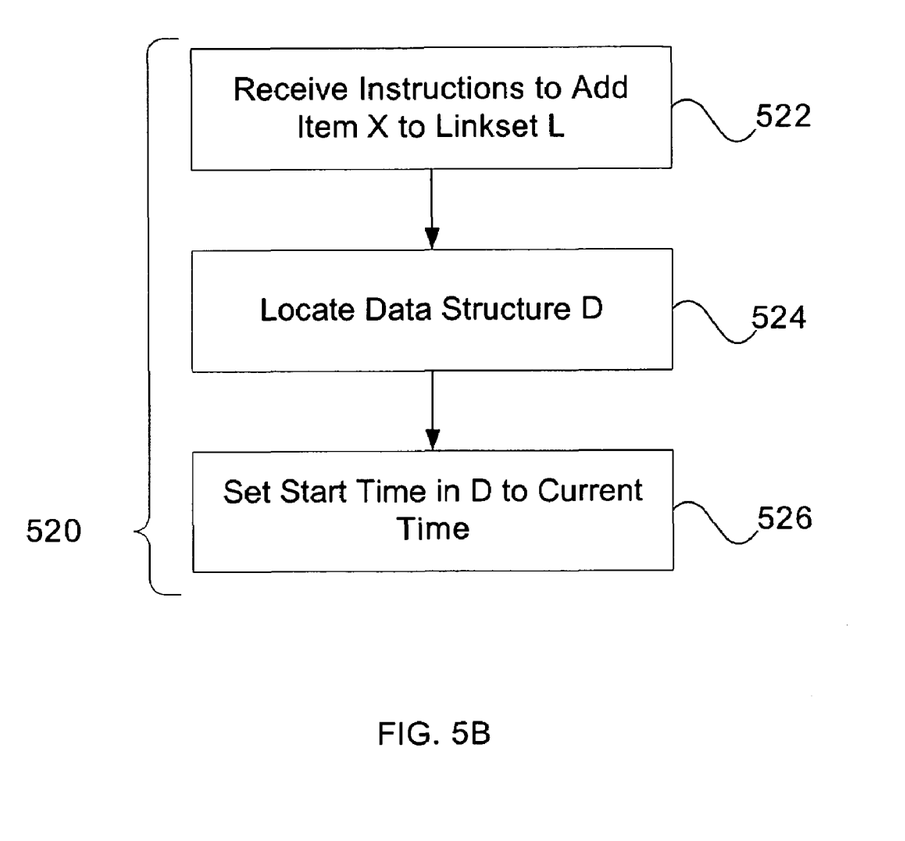
Figure 5C:
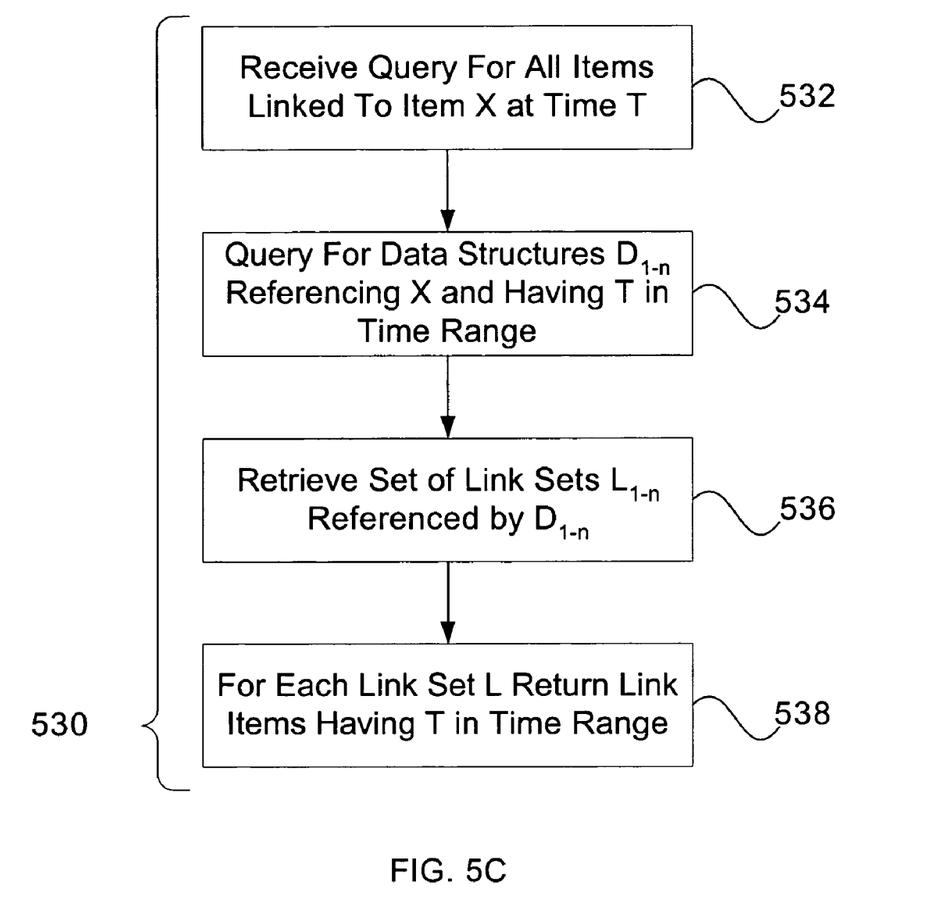

A method 500 for adding an association is presented in FIG. 5A. The method begins when a program executing the method, such as a server 220 in a project management system 200, receives a request to add an assocation for an item X to a set of associated objects in a link set L (block 502). In one embodiment of the invention, the request to add the association will be through a call to a method defined by an API (Application Program Interface).

In response to the request, the system creates a link content data structure D (block 504). The start time field in D is set to the current time to indicate when the association was initially valid (block 506). In one embodiment of the invention, the end time field is set to null to indicate that the association is currently valid (block 506). In an alternative embodiment of the invention, the end time field is left blank. In a further alternative embodiment of the invention, a flag can be used to to indicate the association is currently valid.

Next, the program executing the method sets an item reference field in D to refer to item X (block 510). In one embodiment of the invention, the reference is made via a URL, as described in the previous section. In alternative embodiments of the invention, the reference can be a database key or a memory pointer.

Lastly, the method sets a link set reference field in D to refer to a data structure describing the link set, such as link set data structure 300 (block 512). In one embodiment of the invention, the reference is established using a database key to a row in a link set table. In an alternative embodiment of the invention, the reference is established using a memory pointer to the link set data structure. The invention is not limited to any particular reference mechanism.

It should be noted that the invention is not limited to performing the tasks detailed above in the precise order described. Those of skill in the art will appreciate that variations in the order are within the scope of the invention.

A method 520 for removing an item from a set of associated items is presented in FIG. 5B. The method begins when a program executing the method, such as a server 220 in a project management system 200, receives a request to remove the assocation for an item X to a set of associated objects from a link set L (block 522). In one embodiment of the invention, the request to remove the association will be through a call to a method defined by an API (Application Program Interface).

Next, the program executing the method searches a set of data structures describing link content items to locate the data structure D that associates X to L (block 524). In one embodiment of the invention, the data structure exists as a row in a link content item table. The desired row must meet three criteria: 1) the row's item refernce refers to item X, 2) the row's link set identifier refers to link set L, and 3) the row has an end time value that is null or blank.

Lastly, the end time value in the located data structure D is set to the current time (block 526). This indicates that the association is no longer valid for times later than the current time.

Should a user desire to re-establish the association in the link set, a new data structure is created with a new start time and a null end time.

A method 530 for querying a project management system 200 for all items associated with a source item is presented in FIG. 5C. The method begins when a program executing the method, such as a server 220 in a project management system 200, receives a query for all items linked to an item X at a particular point in time T (block 532). In one embodiment of the invention, the query will be issued through a call to a method defined by an API (Application Program Interface) defining the interface between a client application 210 and server 220.

The program executing the method then queries a project association store 204 searching for any link content data structures that reference item X and that are valid for time T (block 534). In one embodiment of the invention, the link content data structures are rows in a link content table. Further, the reference to item X will be in a URL that "points" to item X. In some embodiments of the invention, the validity check with respect to time T compares a start time and an end time field to time T. The link content data structure is valid with respect to time T if the start time is less than or equal to T and the end time is greater than time T or the end time is null or blank.

Next, a set of link sets L is formed comprising those link sets referenced by the link set reference identifier from each of the link content items that were determined to be valid with respect to time T (block 536).

Finally, for each link set in L, search all link content items that reference link set L and return those that are valid with respect to time T. Like the validity check for item X, the validity with respect to time T for the potential associated items compares the start time and end time fields to time T. The link content data structure for the potentially associated item is valid with respect to time T if the start time is less than or equal to T and the end time is greater than time T or the end time is null or blank.

CONCLUSION

Maintaining versions of associations between project management has been described. As those of skill in the art will appreciate, the embodiments of the invention provide advantages not found in previous systems. For example, the system and methods of the invention provide a mechansims for a user to perform historical and temporal queries of associations between source code files, bug data, and specification files. The temporal queries can be used to determine the associations between project management objects as they existed at any particular point in time.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the present invention.

For example, those of ordinary skill within the art will appreciate that while maintaining versions of associations has been described in the context of project management objects, the systems and methods of the invention can be extended to include associations between any object that can be referenced through a URL. Furthermore, while the association data is described as being stored in a relational database, other means of storing persistent objects can be readily substituted. For example, the project association data could be stored in an object oriented database. The terminology used in this application is meant to include all of these environments. Therefore, it is manifestly intended that this invention be limited only by the following claims and equivalents thereof.

We claim:

1. A computer readable medium having computer executable instructions for performing a method for adding an association of a project management object to a set of associated project management objects, wherein a link set data structure corresponds to the set of associated project management objects, the method comprising:

creating a link content data structure comprising a link set reference field, an object reference field, and a start time field;

adding an association of the project management object to said set of associated project management objects by setting said link set reference field in said link content data structure to a value that refers to said link set data structure corresponding to the set of associated project management objects;

setting said object reference field in said link content data structure to refer to the project management object; and setting said start time field in the link content data structure to a value representing the current time.

2. The computerized method computer readable medium of claim 1, wherein setting an object reference field includes setting the object reference field to a URL (Uniform Resource Locator) that locates the project management object.

3. The computer readable medium of claim 1, wherein the link content data structure is a row in a database.

4. The computer readable medium of claim 1, wherein the link set data structure is a row in a database.

5. The computer readable medium of claim 1, wherein the project management object is selected from the group consisting of: source code file, development issue data, bug data, project milestone, and software specification file.

6. A computer readable medium having computer executable instructions for performing a method for adding an association of a project management object to a set of associated project management objects, the method comprising:

creating a link content data structure;

setting a link set reference field in said link content data structure to a value that refers to a link set data structure corresponding to the set of associated project management objects;

setting an object reference field in said link content data structure to refer to the project management object; and setting a start time field in the link content data structure to a value representing the current time.

7. The computer-readable medium of claim 6, wherein setting an object reference field includes setting the object reference field to a URL (Uniform Resource Locator) that locates the project management object.

8. The computer-readable medium of claim 6, wherein the link content data structure is a row in a database.

9. The computer-readable medium of claim 6, wherein the link set data structure is a row in a database.

10. The computer-readable medium of claim 6, wherein the project management object is selected from the group consisting of: source code file, development issue data, bug data, project milestone, and software specification file.

* * * * *